United States Patent

Hensley

[15] 3,635,381
[45] Jan. 18, 1972

[54] FRONT FLOOR MOUNTED AND SEAT ATTACHED VEHICLE GUN RACK

[72] Inventor: John V. Hensley, Shreveport, La.
[73] Assignee: Jack H. Kaplan, Shreveport, La. a part interest
[22] Filed: Aug. 22, 1969
[21] Appl. No.: 852,290

[52] U.S. Cl. ..........................224/1, 224/29.4, 224/42.42 A, 248/302, 248/304
[51] Int. Cl. .................................................A47b 81/00
[58] Field of Search...........224/0.5, 1, 29.4, 42.42, 42.42 A, 224/42.45, 42.45 B, 29; 248/201, 302, 303, 304, 204; 211/64

[56] References Cited

UNITED STATES PATENTS

| | | | |
|---|---|---|---|
| 1,030,425 | 6/1912 | Owen | 248/304 X |
| 2,271,784 | 2/1942 | Tritt | 248/201 X |
| 2,797,033 | 6/1957 | Rasbach | 224/1 |
| 3,104,040 | 9/1963 | Stevens | 224/29 |
| 3,252,637 | 5/1966 | Hart | 224/1 |
| 3,429,541 | 2/1969 | Herman | 248/302 |
| 3,504,830 | 4/1970 | Trammell | 224/29.4 |

*Primary Examiner*—Albert J. Makay
*Attorney*—Clarence A. O'Brien and Harvey B. Jacobson

[57] ABSTRACT

A pair of upstanding structures for supporting longitudinally spaced portions of an elongated horizontal member extending transversely in front of the forward edge of a vehicle seat cushion. Each of the cradle structures includes front and rear sides and a pair of upstanding opposite side legs spaced horizontally apart at their lower ends and joined together at their upper ends and is provided with an upper upwardly opening U-shaped cradle element disposed in an upstanding plane generally normal to an upstanding plane containing the lower end portions of the legs of the cradle structure with the cradle element projecting forwardly from the front side of the structure. Also, elongated resilient tension members have one pair of corresponding ends thereof supported from upper portions of the cradle structures and anchor portions on the other pair of ends thereof for anchoring to the forward lower edge of the associated seat cushion when the cradle structures are disposed upright in front of the seat cushion.

5 Claims, 4 Drawing Figures

PATENTED JAN 18 1972

3,635,381

John V. Hensley
INVENTOR.

BY *Clarence A. O'Brien*
*and Harvey B. Jacobson*
Attorneys

FRONT FLOOR MOUNTED AND SEAT ATTACHED VEHICLE GUN RACK

The gun rack of the instant invention has been designed primarily for the purpose of providing a means whereby a rifle or shotgun and the like may be conveniently supported in the interior of a passenger vehicle for ready access by the driver of the vehicle or another person seated on the front seat of the vehicle alongside the driver.

Law enforcement officers sometimes desire to support a shotgun or rifle within their patrol vehicles or the like for ready access thereto should the need arise. To this end, the gun rack of the instant invention will be used primarily in supporting a rifle or shotgun immediately forward of the front edge of the front seat cushion of a vehicle. Although the gun rack could be utilized to support a rifle or shotgun in horizontal position immediately forwardly of the rear seat cushion of some patrol vehicle, inasmuch as the rear seat area of some patrol vehicles are often occupied by persons under arrest, the most desired function of the gun rest or rack will be to support a rifle of shotgun immediately forwardly of the front seat cushion of a vehicle.

The gun rack supports the associated rifle or shotgun in horizontal position and for ready disengagement from the rack whereby a person dismounting the front seat area of the vehicle from either side may readily grasp the rifle or shotgun supported by the rack for removal from the vehicle as the person dismounts from the vehicle.

It is accordingly the main object of this invention to provide a gun rack operable to support a rifle or shotgun in horizontal position extending along and immediately forwardly of the forward edge of a vehicle front seat cushion below the top of the cushion and above the floor of the associate vehicle.

Another object of this invention, in accordance with the immediately preceding object, is to provide a gun rack which may be readily mounted in and withdrawn from substantially all motor vehicles without the use of tools.

Still another object of this invention is to provide a gun rack which will be capable of supporting a rifle or shotgun for ready removal from the rack whenever desired.

A further important object of this invention, in accordance with the preceding objects, is to provide a gun rack whose structural components enable it to be supported from various types of vehicles which might be utilized by law enforcement officers or the like.

A final object of this invention to be specifically enumerated herein is to provide a gun rack in accordance with he preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

Figure 3:
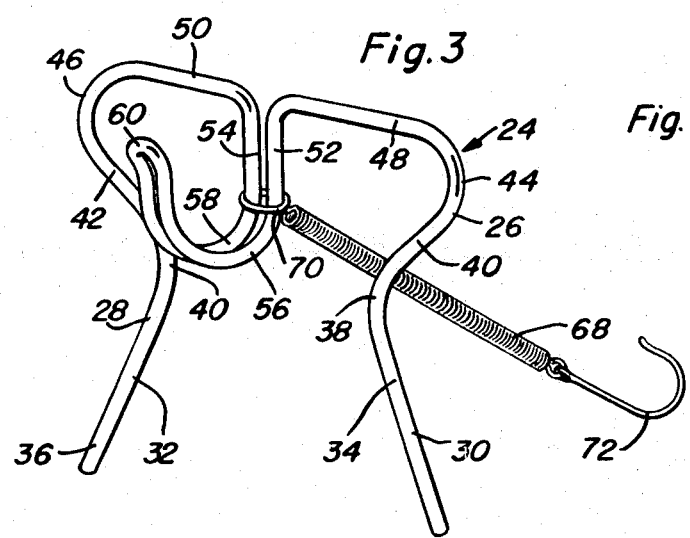
Figure 4:
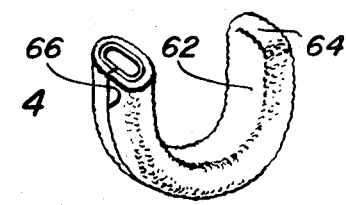

FIG. 3 is an enlarged perspective view of one of the cradle structures which are utilized in pairs to form the gun rack of the instant invention; and FIG. 4 is a perspective view of a protective covering provided for installation over each of the U-shaped cradle elements of the gun rack whereby longitudinally spaced portions of a rifle or shotgun may be supported from the rack without marring the rifle or shotgun.

Referring now more specifically to the drawings, the numeral 10 generally designates a vehicle front seat construction including a backrest 12 and a seat cushion 14. The seat structure or construction 10 is disposed within a conventional motor vehicle referred to in general by the reference numeral 16 and which includes a front floor 18 having the usual longitudinal hump 20.

The gun cradle or rack of the instant invention is referred to in general by reference numeral 22 and includes a pair of gun cradle structures 24 whose structural features may best be seen in FIG. 3 of the drawings. Each of the gun cradle structures 24 comprises an upstanding frame 26 constructed of a single piece 28 of rodlike material. The frame 26 includes a pair of opposite side legs 30 and 32 whose lower end portions 34 and 36 are upwardly convergent and curve away from each other as at 38 and 40 so as to define upwardly convergent upper end portions 40 and 42 which curve upwardly and toward each other as at 44 and 46 at their upper ends.

The curved portions 44 and 46 terminate inwardly in horizontally directed arm portions 48 and 50 projecting toward each other and which terminate at their inner ends in downturned legs 54 whose lower ends curve forwardly and upwardly as at 56 and 58 and are joined at their free ends by means of an integral reversely bent portion 60. Accordingly, it may be seen that the frame 26 is of one piece construction and that the legs 52 and 54 as well as the forwardly and upwardly curving portions 56 and 58 define an upwardly opening channel which generally parallels the plane containing the legs 30 and 32 of the frame 26.

A U-shaped resilient sleeve 62 is closed as at 64 at one end and is longitudinally slotted as at 66 at the other end. The resilient sleeve 62 is slipped over at least the lower portions of the legs 52 and 54 as well as the forwardly and upwardly curving portions 56 and 58 thereof. Also, the closed end 64 of the sleeve 62 encloses the reversely bent portion 60.

Figure 1:
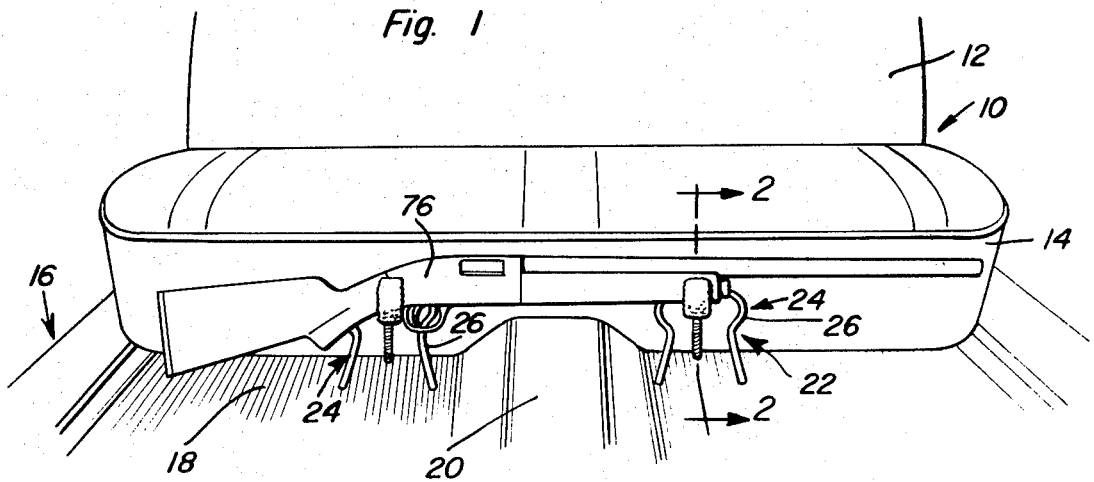
FIG. 1 is a perspective view of the gun rack illustrated mounted within the front passenger compartment of a vehicle and in use supporting a shotgun in horizontal position extending along the forward edge of the front cushion of the vehicle.
Figure 2:
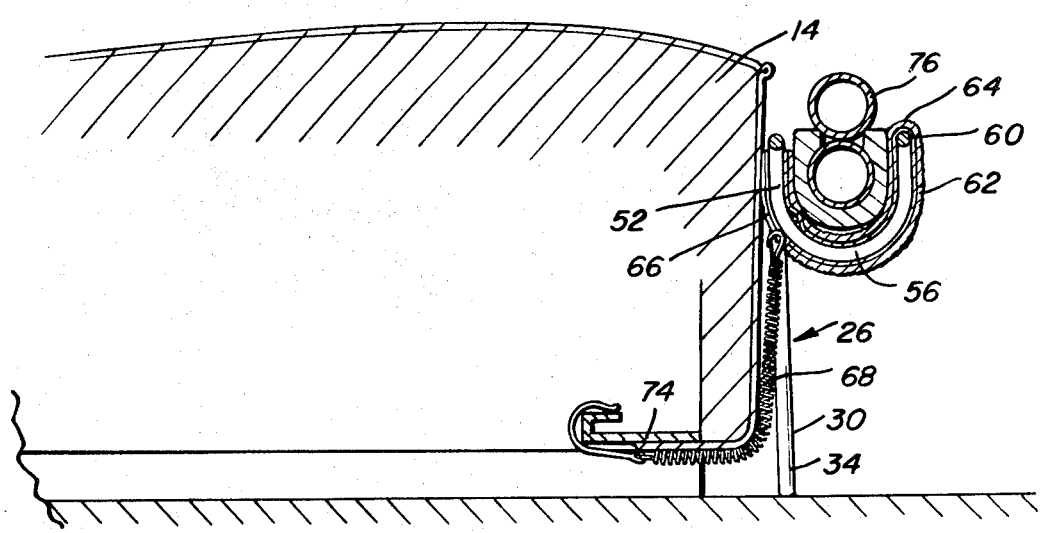
FIG. 2 is an enlarged fragmentary vertical sectional view taken substantially upon the plane indicated by the section line 2—2 of FIG. 1.

From FIG. 1 of the drawings it may be seen that a pair of gun cradle structures 24 are utilized and positioned on opposite sides of the hump 20 with the lower ends of the legs 30 and 32 resting upon floor 18 on opposite sides of the hump 20. However, in order to maintain the gun cradle structures 24 in position, a pair of expansion springs 68 are provided and define elongated tension members. One end of each expansion spring 68 is anchored to a ring 70 slidably disposed over the corresponding legs 52 and 54 and the other end of each expansion spring 68 includes a hook 72 which may be engaged with front lower frame portion 74 of the seat cushion 14. Thus, as may be seen from FIG. 2 of the drawings, the expansion springs 68 maintain the gun cradle structures 24 in position with the rear sides of the frames 26 abutting the front face of the forward marginal edge portion of the seat cushion 14. Of course, it may be seen that the channels defined by each pair of forwardly and upwardly curving portions 56 and 58 of the legs 52 and 54 are aligned and that longitudinally spaced portions of a shotgun 76 are cradled in the channel defining cradle elements comprising the legs 52 and 54 and the corresponding forwardly and upwardly curving portions 56 and 58 thereof. The wooden and metal portions of the shotgun 76 are protected from contact with the legs 52 and 54 or the reversely bent portion 60 by means of the sleeve 62 and it will be readily observed that the shotgun 76 may be readily lifted from either side of the vehicle 16 and withdrawn from the vehicle 16 as a person therein dismounts therefrom. Further, the gun rack represented by the pair of gun cradle structures 24 may be readily removed from the vehicle 16 and mounted on another vehicle. In addition, the gun cradle structures 24 are constructed in a manner whereby they may be readily mounted in substantially all vehicles and also in the rear seat areas of substantially all vehicles, if such mounting of the gun cradling structures 24 is desired. Also, the hook 72 may be releasable engaged with any suitable portion of the seat cushion 14 which will provide a suitable anchor therefor, such as a rear lower frame portion (not shown).

It is proposed that a noncorrosive material such as aluminum be utilized in the construction of the frames 26, although it is to be understood further that any other suitable material such as plastic could be utilized, if desired. Further, the tension members represented by the springs 68 need not be in the form of expansion springs but it is desirable that some type of elastomeric tension member be utilized.

The foregoing is considered as illustrative only of the principles of the invention. Further, since numerous modifications and changes will be readily occur to those skilled in the art, it is not desired to limit the invention to the exact construction and operation shown and described, and accordingly all suitable modifications and equivalents may be resorted to, falling within the scope of the invention.

What we claim as new is as follows:

1. A gun cradle structure for supporting an elongated horizontal member forward of the front marginal edge of a vehicle seat cushion with the elongated member extending along said front marginal edge, said cradle structure including front and rear sides and a pair of upstanding opposite side legs spaced horizontally apart at their lower end portions and joined together at their upper ends, said cradle structure further including an upper upward opening U-shaped cradle element disposed in an upstanding plane generally normal to a plane containing the lower end portions of said legs with the cradle element projecting from the front side of said structure, an elongated tension member having one end anchored to an upper portion of said cradle structure and adapted at its other end for anchoring to the lower forward marginal edge portion of an associated vehicle seat cushion, said cradle structure comprising a single piece of heavy gauge rodlike material whose opposite end portions define said legs, said single piece including portions thereof projecting inwardly toward each other from the upper ends of said legs and terminating inwardly in downturned portions adjacent each other whose lower ends curve forwardly and upwardly and terminate in an integral reversely bent portion, the forwardly and upwardly curving portions of said single piece defining said cradle element.

2. The combination of claim 1 wherein the lower end portions of said legs are upwardly convergent.

3. The combination of claim 2 wherein the upper end portions of said legs are upwardly divergent.

4. An upstanding structure including opposite side legs joined together at their upper ends, said legs being disposed generally in an upstanding plane, said structure including means adjacent its upper end projecting outwardly of one side of said plane defining an upwardly opening horizontal channel open at its opposite ends and generally paralleling said plane, said structure being free of projections projecting outwardly of the other side of said plane and adapted to be supported, by it legs, from the floor of a vehicle with the upper portion of said structure abutting the front face of a vehicle seat cushion with the seat cushion disposed on the side of said plane remote from said channel, and means attached to said structure and adapted to be anchored to said seat cushion for preventing the upper portion of said structure from swinging forwardly away from said seat cushion, said cradle structure comprising a single piece of heavy gauge rodlike material whose opposite end portions define said legs, said single piece including portions thereof projecting inwardly toward each other from the upper ends of said legs and terminating inwardly in downturned portions adjacent each other whose lower ends curve forwardly and upwardly and terminate in an integral reversely bent portion, the forwardly and upwardly curving portions of said single piece defining said cradle element, and a resilient sleeve covering disposed over said downturned portions, including their forwardly and upwardly curving portions.

5. The combination of claim 4 wherein said sleeve includes a closed end portion in which said backturned portion is received.

* * * * *